Jan. 24, 1967 B. LONG 3,300,289
CONTINUOUS METHOD OF MAKING A GLASS SHEET
Filed April 29, 1964 2 Sheets-Sheet 2

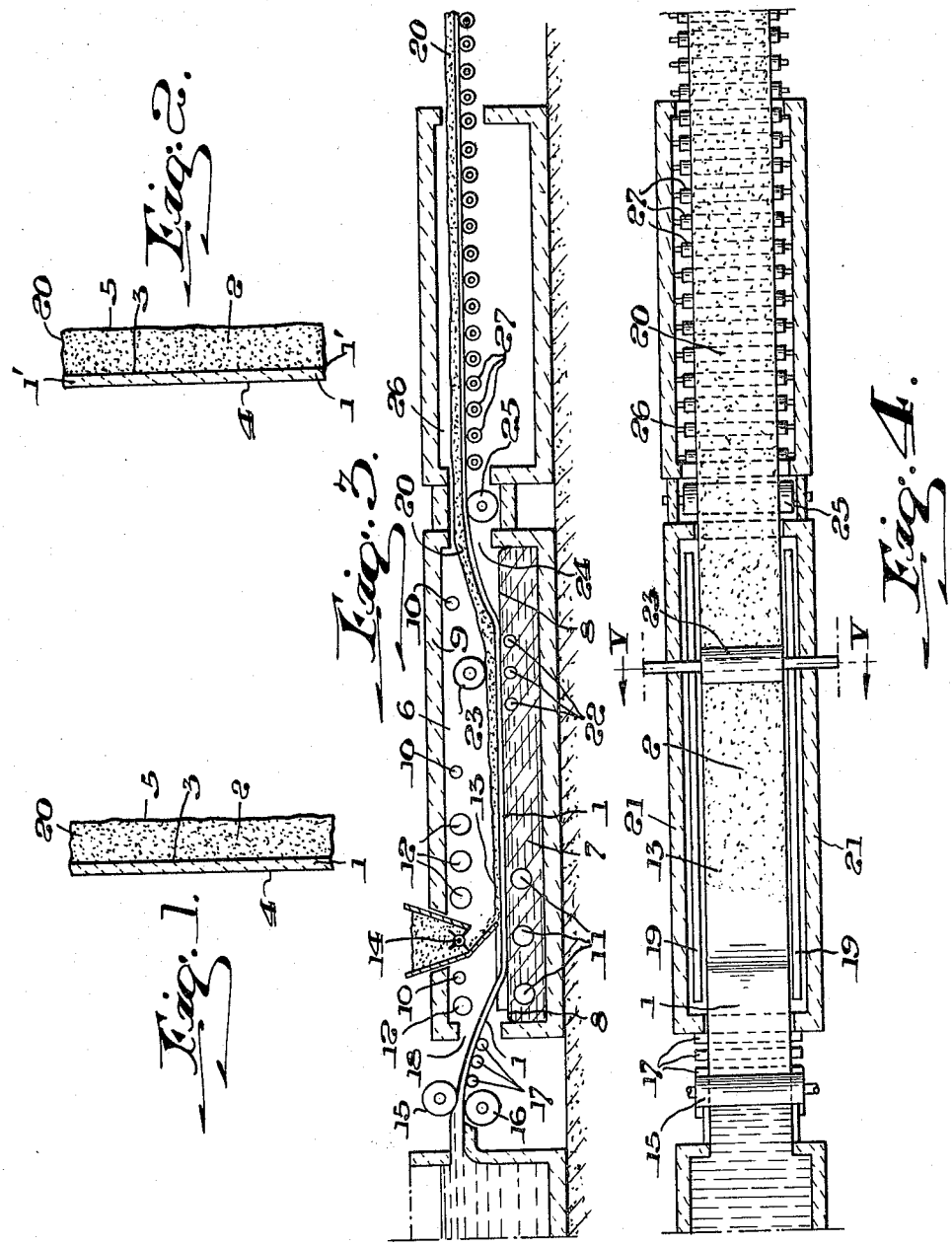

INVENTOR.
BERNARD LONG.
BY Stanley J Price
his ATTORNEY.

United States Patent Office 3,300,289
Patented Jan. 24, 1967

3,300,289
CONTINUOUS METHOD OF MAKING A GLASS SHEET
Bernard Long, Paris, France, assignor to Pittsburgh Corning Corporation, Port Allegany, Pa., a corporation of Pennsylvania
Filed Apr. 29, 1964, Ser. No. 363,517
Claims priority, application France, May 16, 1963, 935,102
5 Claims. (Cl. 65—22)

This invention relates to an improved glass product and a continuous process for making the glass product, and more particularly to a glass plate having a sheet of multicellular glass bonded thereto and to a continuous process for cellulating the multicellular glass sheet and bonding it to the glass plate.

Architecturally, plate glass having an inside surface covered with a layer of colored opaque enamel provides an esthetic appearance to modern building structures. The plate glass is secured to the front walls of a building and is referred to as a plate glass curtain wall. To improve the thermal insulation of the curtain wall a suitable insulation has, in the past, been secured to the inner surface of the plate glass curtain wall by means of a suitable adhesive.

Multicellular glass, which is an inorganic vitreous material having a multitude of gaseous cells separated from one another by small glass envelopes, has superior properties when compared with other forms of thermal insulation. Multicellular glass is dimensionally stable, has a low density and thermal conductivity, is impermeable to water and resistant to fire and vermin. Insulated plate glass curtain walls have been made in the past by securing a sheet of multicellular glass to the inner surface of the plate glass curtain wall by an adhesive. The method of bonding the sheet of multicellular glass to the plate glass curtain wall by an adhesive is relatively expensive and is reflected in the ultimate cost of the insulated plate glass curtain wall.

Multicellular glass insulation has been made in the past by a process wherein finely divided or powdered glass is admixed with a gassing or cellulating agent and the admixture cellulated in a heated refractory mold to a cellulating temperature where the powdered glass particles are sintered and coalesce and the cellulating agent reacts to form entrapped bubbles of gas in the sintered mass. The molds are slowly cooled and the formed multicellular glass is thereafter removed from the molds and further processed to make insulating sheets that are secured to a surface of a plate glass curtain wall by a suitable adhesive.

In my copending application entitled "Method of Making Multicellular Glass," Serial Number 363,485, filed April 29, 1964, there is disclosed a continuous process for making a sheet of multicellular glass by feeding an admixture of finely divided powdered glass and a cellulating agent to a surface of a molten metal bath. The admixture is maintained in heat exchange relation with the molten metal bath until the glass particles are heated to a temperature where they are softened and coalesce and the cellulating agent forms gas bubbles in the coalesced mass. The sheet of multicellular glass is thereafter slowly cooled in an annealing lehr and cut transversely into blocks or sheets of the desired length.

Briefly, the process herein disclosed comprises conveying a continuous strip of flat glass in a flexible softened condition to a heating chamber that contains a bath of molten metal. The strip of flat glass is floated on the upper surface of the molten metal bath in heat exchange relation therewith. An admixture of powdered glass and a cellulating agent is distributed onto the upper surface of the flat glass strip as the strip moves longitudinally through the heating chamber. The admixture is heated to a temperature where the powdered glass particles soften and coalesce and the cellulating agent reacts to form entrapped bubbles in the coalesced glass particles to thereby form a sheet of multicellular glass that is in overlying relation with the strip of flat glass. The sheet of multicellular glass is fused or bonded to the upper surface of the strip of flat glass to form a unitary continuous strip comprising the flat glass and the sheet of multicellular glass. The unitary sheet is slowly cooled in an annealing or cooling lehr and thereafter cut transversely into sections having a preselected dimension. The resulting product is an insulating curtain wall structure consisting essentially of all glass with a fused bond between the flat glass and the sheet of multicellular glass.

In another embodiment of the invention herein disclosed the continuous strip of flat glass is coated on its top or upper surface with an enamel or the like before it passes into the heating chamber. The admixture of powdered glass and cellulating agent is deposited on the enameled surface and the admixture as it cellulates is fused to the enamel coating. The insulated flat glass curtain wall obtained by this process includes an enamel coating fused to one surface of the flat glass and a sheet of multicellular glass fused to the other surface of the enamel coating.

Throughout the specification the strip or sheet of translucent uncellulated glass that forms the exterior portion of the curtain wall structure is designated as a strip of plate glass. Generally, the term plate glass designates flat glass formed by a rolling process that is thereafter annealed, ground and polished. It should be understood, however, that sheet glass, generally referred to as window glass and formed by the well-known drawing processes, may also be used as the exterior portion of the curtain wall. Throughout the specification the term flat glass is used to designate both plate glass formed by the rolling process and sheet glass formed by the drawing process.

Accordingly, the principal object of this invention is to provide a glass product that has a layer of multicellular glass fused to a strip of flat glass.

Another object of this invention is to provide a continuous process for cellulating a sheet of multicellular glass and fusing the multicellular glass to a surface of a strip of flat glass.

Another object of this invention is to provide a glass product, suitable for use as a curtain wall structure, that has a strip of flat glass with an enamel coated inner surface and a sheet of multicellular glass insulation fused to the enamel-coated surface.

Another object of this invention is to provide a continuous process for fusing an enamel coating to a surface of a flat glass strip and thereafter fusing a layer of multicellular glass to the enameled surface.

These and other objects and advantages of this invention will be more completely disclosed and described in the following specification, the accompanying drawings and the appended claims.

In the drawings:

FIGURE 1 is a fragmentary sectional view of the glass product suitable for use as an insulated flat glass curtain wall.

FIGURE 2 is a view similar to FIGURE 1 illustrating another embodiment of the glass product wherein the inner surface of the flat glass is coated with an enamel coating and the sheet of multicellular glass is fused thereto.

FIGURE 3 is a diagrammatic vertical section illustrating the process for making the glass product illustrated in FIGURE 1.

FIGURE 4 is a top plan view of the apparatus illustrated in FIGURE 3 with the top portions of the heating and cooling chambers removed.

Figure 5:
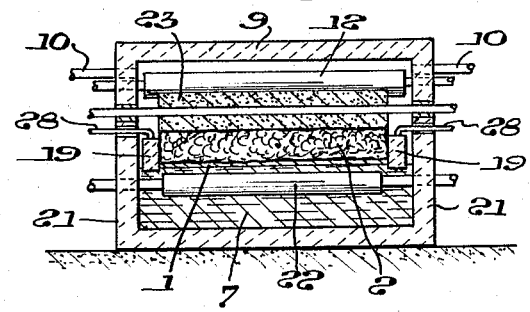
FIGURE 5 is a vertical transverse section taken along the lines 3—3 of FIGURE 2 illustrating the roller means for rigidifying the upper surface of the sheet of multicellular glass fused to the continuous sheet of flat glass.

In FIGURES 3–5 there is illustrated diagrammatically a process for making the glass product illustrated in FIGURE 1. The glass product is designated by the numeral 20 in FIGURE 1 and includes a flat glass body portion 1 having surfaces 3 and 4. The surface 4 is the exposed surface of the glass product when it is used as a curtain wall structure, and the surface 3 is considered the under surface. Fused to the under surface of the flat glass body portion 1 is a sheet of multicellular glass 2 that has an exposed surface 5. The flat glass body portion 1 may have a thickness of between 0.08 to 0.32 inch. The multicellular glass insulation 2 may have a thickness of between 0.8 to 3.2 inches. The thickness of the multicellular glass sheet can be varied according to the amount of insulation desired for the glass product when it is utilized as a curtain wall or the like.

The exterior surface 4 of flat glass body portion 1 may have recesses, undulations or the like caused by the rollers retained thereon, or the surface 4 can be treated to provide a flat, smooth, polished surface. The polished surface is obtained in advance when the sheet of flat glass is drawn as a continuous strip from the melting tank. The polish can also be obtained during the process of this invention by heating the exposed surface 4 to a high enough temperature for a sufficient time by means of the molten metal bath, later described.

The exposed surface 5 of the multicellular glass sheet 2 will generally have undulations because of the irregularities formed in the surface during the cellulation of the admixture. These undulations can be minimized by a roller mechanism, as later discussed, or the surface 5 may be mechanically flattened or leveled by means of sawing or the like. Where the glass product 20 is to be secured to fixed partitions or existing flat walls, it is desirable that the surface 5 be flat and regular.

Referring to FIGURES 3 and 5 the process for making the glass product illustrated in FIGURE 1 is illustrated. A continuous strip of flat glass 1 is rolled from a melting tank between two rollers 15 and 16 in a conventional known manner. The strip 1 is supported by auxiliary rollers 17 and is fed into an elongated heating chamber 6 through an opening 18 adjacent one end. The elongated chamber 6 has a molten metal bath 7 therein with an upper horizontal surface 8. The molten metal bath 7 is preferably tin or a tin alloy. Any suitable metal or alloy that, in a molten state, serves as a suitable heat exchange media and does not adhere to the molten glass, may also be used. The chamber 6 has an upper portion 9 that encloses the upper surface 8 of the molten metal bath 7. A plurality of tubes 10 extend transversely through the chamber side walls 21 above the molten metal bath 7 and supply an inert gas such as nitrogen or the like into the chamber 6 so that the atmosphere above the molten metal bath top surface 8 is kept nonoxidizing. The molten metal bath 7 is heated by the submerged elements 11 and heating elements 12 that are located above the molten metal bath top surface 8. There is an opening in the chamber upper portion 9 in which there is positioned a distributor device 14 that may be cooled in any suitable manner. Within the distributor 14 there is an inventory of an admixture of powdered glass and a cellulating agent.

The continuous strip of flat glass 1 is fed into the chamber 6 and onto the molten metal bath upper surface 8 so that the strip 1 is in heat exchange relation with the molten metal bath. The strip 1 moves continuously through the chamber 6 at a predetermined speed. The admixture of powdered glass and cellulating agent is fed at a preselected rate from the distributor 14 onto the upper surface of the flat glass strip 1. Heat is transferred through the endless flat glass strip 1 from the molten metal bath to the admixture deposited on the upper surface of the flat glass strip 1. The upper surface of the admixture is also heated by radiation from the heating elements 12 positioned thereabove. The admixture is heated to a temperature of between 1472 and 1652° F. where it softens and coalesces and swells or cellulates. The admixture is heated to the cellulating temperature as it progresses longitudinally along the elongated heating chamber 6.

There is provided within the heating chamber 6 a pair of elongated graphitic barriers or guides 19 which are positioned adjacent the chamber side walls 21 and partially submerged in the molten metal bath (FIGURE 3). The guides 19 are connected to rods 28 which control the spacing therebetween and also the relative position of the guides 19 in the molten metal bath 7. As the admixture cellulates to form the multicellular glass 2 the guides 19 limit the lateral dimension of the multicellular sheet, The guides 19 are formed of a graphitic material and molten glass does not adhere thereto so that the endless sheet of multicellular glass is freely conveyed along with the flat glass strip 1.

As the endless strip of flat glass 1 and the multicellular glass sheet 2 move through the heating chamber 6 the upper surface of the flat glass strip 1 is softened and the powdered glass in the admixture fed from distributor 14 is also softened during the cellulation process so that the multicellular glass is fused to the upper surface 3 of flat glass strip 1.

Adjacent the outlet end of the heating chamber 6 there are a plurality of cooling elements 22 extending transversely through the molten metal bath 7 below the upper surface 8. A roller 23 is positioned above the cooling elements 22 and is preferably formed of a graphitic material. The roller 23 includes a cooling means such as a tubular support shaft through which a cooling media continuously flows. Softened flat glass strip 1 with the softened multicellular glass strip 2 fused thereto moves between the molten metal bath upper surface 8 and the cooling roller 23. The cooling elements 22 in the molten metal bath 7 reduce the temperature and thereby harden or rigidify, to an extent, the portion of the endless flat glass strip 1 thereabove. The roller 23 also cools and hardens the multicellular glass strip 2 and further smooths the multicellular glass strip upper surface 5.

The hardened or rigidified fused product 20 is conveyed from the heating chamber 6 through an outlet 24 and into an elongated cooling chamber or annealing lehr 26. The fused product 20 is supported between the heating chamber 6 and cooling chamber 26 on an intermediate roller 25. Within the cooling lehr or chamber 26 the fused product 20 is supported on rollers 27. The fused product 20, although relatively hardened or rigidified, is at an elevated temperature as it enters the cooling chamber 26 and is slowly cooled to an ambient temperature. The fused product 20, after it is cooled to a handleable temperature, is withdrawn from the cooling chamber 26 and cut transversely into sections of preselected size.

Figure 6:
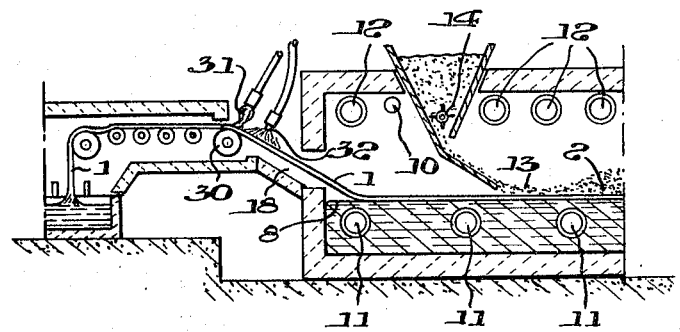
FIGURE 6 is a diagrammatic vertical section of a portion of the process for forming the improved glass product illustrated in FIGURE 2.

Referring to FIGURE 6, there is illustrated another embodiment of the invention by which the fused product 20 illustrated in FIGURE 2 includes a coating of a colored enamel or the like on the under side or inner surface 3. The strip of multicellular glass 2 is fused to the enamel coated surface 1′ in a manner similar to the method of fusing the multicellular sheet 2 to the flat glass strip, as previously described. Similar numeral designations in FIGURE 6 refer to similar parts previously discussed.

The continuous strip 1 is drawn from a conventional glass drawing machine, schematically illustrated in FIGURE 6, and is conveyed over a roller 30. The continuous strip 1 as it reaches the roller 30 is at a temperature slightly below the softening temperature of the glass strip.

A series of burners 31 are positioned above the roller 30 and heat the continuous flat glass strip 1 to a softening temperature so that the continuous strip 1 is flexible. Adjacent and downstream of the burners 31 there are a series of spray guns 32 that spray an enamel suspended in an appropriate liquid onto the softened surface of the continuous flat glass strip 1. The enamel adheres to the softened surface of the continuous strip 1 and rapidly forms a sheet of enamel thereon. The admixture from distributor 14 is spread onto the sheet of enamel, as is illustrated in FIGURE 6, and is cellulated to form a continuous multicellular strip 2 that is fused to the sheet of enamel which, in turn, is fused to the continuous flat glass strip 1. The fused product 20 formed by the process illustrated in FIGURE 6 is then subjected to the cooling steps previously described in conjunction with the process illustrated in FIGURES 3 and 4.

It is preferred for certain applications that the powdered glass in the admixture that forms the multicellular glass strip 2 is obtained by pulverizing glass of the same composition as that of which the continuous strip 1 is made. With the same glass formulations in the continuous glass strip 1 and the sheet of multicellular glass 2 both components will have the same expansion characteristics and softening characteristics. It should be appreciated, however, that the cells of the multicellular sheet 2 can undergo a substantial elastic deformation without rupturing or breaking and it is, therefore, possible to have substantial differences in expansion and contraction characteristics between the glass in the continuous flat glass strip 1 and the multicellular glass sheet 2, especially when the multicellular glass sheet 2 has a greater coefficient of expansion.

The multicellular glass sheet 2, because of its function as a thermal insulation, is usually much thicker than the continuous strip of flat glass 1 to which it is fused. It is, therefore, preferable to select a glass composition that expands to a greater extent than the glass composition of the continuous flat glass strip 1. With this arrangement, compression stresses will be developed in the flat glass strip 1 and thereby provide a greater resistance to shock and breakage. The minor tensile stresses that are present in the multicellular glass sheet 2 are inconsequential because of the relative thickness between the multicellular sheet 2 and the flat glass strip 1. For example, the thickness of the multicellular sheet 2 is generally between .8 and 2.4 inches, whereas the continuous flat glass strip 1 seldom exceeds 0.32 inch.

The continuous strip of flat glass designated by the numeral 1 may be made by well-known rolling or drawing processes. Where the continuous strip is obtained by rolling, i.e. a rolled glass or rough plate glass, it is possible to provide a fire polish on the under side of the continuous strip 1 while the admixture is being cellulated on and fused to the upper surface of the flat glass strip 1. It is known that a typical lime soda type glass cellulates at a temperature between 1472 and 1652° F. This is substantially the same temperature at which irregularities in the surface of a rough rolled strip of glass are leveled due to the surface tension. Thus, the glass product resulting from the process previously described is such that the exterior exposed surface of the flat glass strip is flat and polished, which presents a pleasing appearance and which reduces maintenance. For an esthetic appearance, ridges or contours of various design may be intentionally impressed into the upper side of the flat glass strip, that is, the surface to which the multicellular sheet is fused. With this arrangement the exposed surface of the flat glass sheet is flat and polished and the other surface retains the impressed decorative design. Where the continuous strip of flat glass 1 is formed by drawing, i.e. window glass, it is possible to obtain a relatively thin strip of flat glass, that is, one having a thickness of between 0.08 to 0.12 inch.

By the process illustrated in FIGURE 6 it is now possible to obtain a glass product that has a coating on one surface of the flat glass strip and a sheet of multicellular glass fused thereto. The glass strip in this process may be obtained by the well-known rolling or drawing processes. The continuous strip is first heated and then covered with a continuous layer of colored opaque enamel grains which, at the elevated temperature of the flat glass strip 1, form a colored or opaque sheet. This sheet of enamel grains fuses to the surface of the flat glass strip 1 and the multicellular glass sheet is thereafter fused directly to the sheet of opaque enamel grains.

The admixture supplied to the heating chamber 6 from the distributor 14 consists essentially of a powdered glass that has been admixed with a small quantity of a cellulating agent such as carbon, silicon carbide, limestone, talc and the like. A suitable admixture may contain 99.8% conventional lime soda glass in powdered form having a size that passes through a 50 mesh screen and 0.2% of a cellulating agent such as vegetable carbon, pulverized to a size that passes through a 100 mesh screen. As previously discussed, other formulated glass, in powdered form, can also be utilized in the admixture.

According to the provisions of the patent statutes, the principle, preferred construction and mode of operation of the invention have been explained and what is considered to represent its best embodiments have been illustrated and described. However, it should be understood that within the scope of the appended claims, the invention may be practiced otherwise than as specifically illustrated and described.

What is claimed is:
1. A method of making a glass product comprising:
positioning a sheet of glass on the surface of a bath of molten metal in heat exchange relation with said surface,
forming a layer of an admixture of finely divided glass particles and a cellulating agent on a surface of said sheet of glass while said sheet is maintained on the surface of said bath of molten metal,
heating said layer of said admixture until said finely divided glass particles soften and coalesce and said cellulating agent reacts to cellulate said admixture into a layer of multicellular glass and to fuse said layer of multicellular glass to the surface of said glass sheet, and
thereafter passing said glass sheet with said fused layer of multicellular glass into a cooling chamber and slowly cooling said glass sheet with said layer of multicellular glass fused thereto to form a glass product.
2. A method of making a glass product comprising:
providing an elongated heating chamber having an elongated bath of molten metal with an upper horizontal surface and a heating means above said bath of molten metal adjacent one end of said chamber,
feeding a strip of glass into said chamber adjacent said one end and onto said molten metal bath top surface,
feeding an admixture comprising finely divided glass particles and a cellulating agent onto the top surface of said strip of glass within said chamber and forming a layer of said admixture on said glass strip top surface,
maintaining said strip of glass and said layer of said admixture in heat exchange relation with the top surface of said bath of molten metal and said heating means positioned thereabove so that said finely divided glass particles soften and coalesce and said cellulating agent reacts to cellulate said admixture into a layer of multicellular glass and to fuse said layer of multicellular glass to the surface of said strip of glass, and
thereafter passing said strip of glass with said layer of multicellular glass fused thereto into a cooling chamber and slowly cooling said strip of glass with said layer of multicellular glass fused thereto to form a glass product.

3. A method of making a glass product comprising:
providing an elongated heating chamber having an elongated bath of molten metal with an upper horizontal surface and a heating means above said molten metal bath adjacent one end of said chamber,
heating a surface of a strip of glass,
fusing an enamel coating to said heated surface,
thereafter passing said strip of glass with said enamel coating into said one end of said chamber and onto said molten metal bath top surface,
feeding an admixture comprising finely divided glass particles and a cellulating agent onto the enamel coated surface of said strip of glass within said chamber and forming a layer of said admixture on said glass strip enamel coated surface,
maintaining said strip of glass and said layer of admixture in heat exchange relation with the top surface of said bath and said heating means positioned thereabove so that said finely divided glass particles soften and coalesce and said cellulating agent reacts to cellulate said admixture into a layer of multicellular glass and to fuse said layer of multicellular glass to the enamel coated surface of said strip of glass, and
thereafter passing said enamel coated strip of glass with said layer of multicellular glass fused thereto into a cooling chamber and slowly cooling said strip of glass with said layer of multicellular glass fused thereto to form a glass product.

4. A continuous method of making a glass product comprising:
providing an elongated heating chamber having an elongated bath of molten metal with an upper horizontal surface and a heating means above said bath of molten metal adjacent one end of said chamber,
providing a pair of longitudinally extending guides adjacent the longitudinal edge portions of said elongated bath of molten metal, the lower surfaces of said longitudinal guides being submerged in said bath of molten metal and forming lateral barriers,
supplying a nonoxidizing gas to said chamber above said molten metal bath horizontal surface to maintain a nonoxidizing atmosphere within said chamber,
supplying heat to said bath of molten metal to maintain said metal in a molten liquid state,
feeding a continuous strip of glass into said one end of said chamber and onto said molten metal bath top surface and continuously moving said strip of glass on said molten metal bath top surface,
feeding an admixture comprising finely divided glass particles and a cellulating agent onto the top surface of said strip of glass within said chamber and forming a layer of said admixture on said glass strip top surface, said layer extending transversely across said bath between said longitudinal guide members,
moving said strip of glass and said layer of said admixture longitudinally on the upper surface of said bath between said longitudinally extending guide members,
maintaining said strip of glass and said layer of said admixture in heat exchange relation with the top surface of said bath of molten metal and said heating means positioned thereabove so that said finely divided glass particles soften and coalesce and said cellulating agent reacts to cellulate said admixture into a layer of multicellular glass and to fuse said layer of multicellular glass to the surface of said strip of glass,
passing said strip of glasss with said layer of multicellular glass fused thereto between said molten metal bath top surface and a cooling roll within said chamber to harden the surface of said layer of multicellular glass, and
thereafter passing said strip of glass with said layer of multicellular glass fused thereto into a cooling chamber and slowly cooling said strip of glass with said layer of multicellular glass to form said glass product.

5. A method of manufacturing cellular glass, comprising forming a ribbon of glass and advancing the ribbon along a bath of molten meal at a controlled rate, depositing on the ribbon of glass a layer of a mixture of powdered glass-forming material and a foaming agent, and heating the layer as it is advanced over the bath by the advancing ribbon of glass so that the powdered glass forming material softens and the foaming agent reacts to cellulate the mixture to form a layer of cellular glass backed by a ribbon of glass to which the cellular glass is fused.

References Cited by the Examiner
UNITED STATES PATENTS

| | | | |
|---|---|---|---|
| 756,971 | 4/1904 | Leighton | 52—307 |
| 1,748,587 | 2/1930 | Smedley | 65—22 |
| 2,118,707 | 5/1938 | Ingouf | 65—22 |
| 2,187,086 | 1/1940 | Koehring | 264—41 |
| 2,205,534 | 6/1940 | Lytle | 65—22 |
| 2,937,938 | 5/1960 | Fiedler et al. | 65—22 |
| 3,013,924 | 12/1961 | Taft et al. | 264—47 |
| 3,083,551 | 4/1963 | Pilkington | 65—65 |

DONALL H. SYLVESTER, *Primary Examiner.*

G. R. MYERS, *Assistant Examiner.*